March 21, 1944.                E. H. SHAFF                2,344,739
                             COUPLING DEVICE
                           Filed Aug. 1, 1942
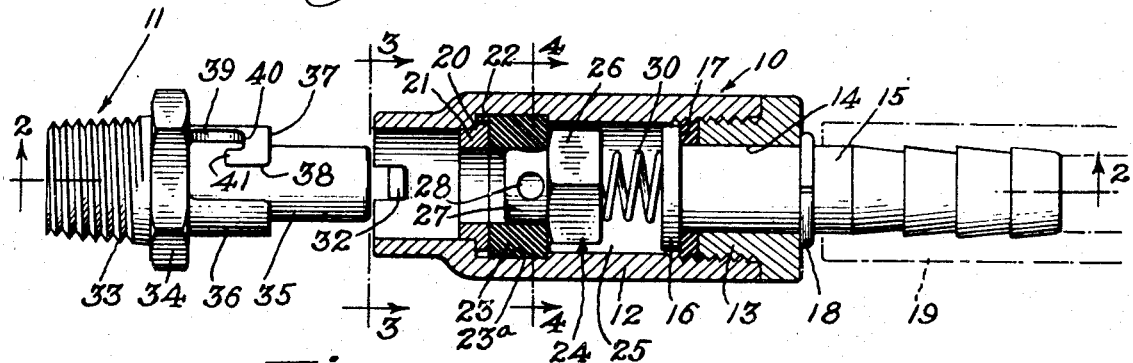
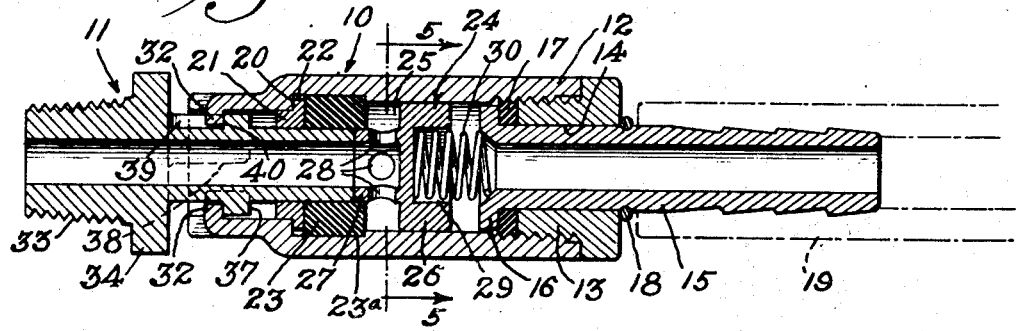
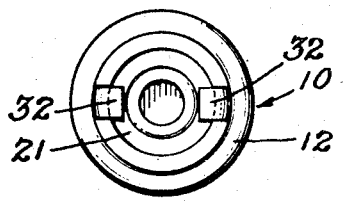    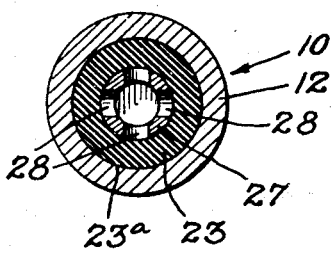
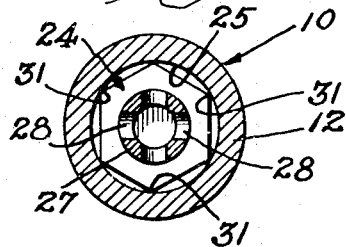
Inventor
Ernest H. Shaff
BY
Parker, Carlson, Pitzner & Hubbard
Attorneys.

Patented Mar. 21, 1944

2,344,739

UNITED STATES PATENT OFFICE 2,344,739

COUPLING DEVICE

Ernest H. Shaff, Grand Haven, Mich., assignor to Keller Tool Company, Grand Haven, Mich., a corporation of Michigan Application August 1, 1942, Serial No. 453,165

1 Claim. (Cl. 284—19)

The invention relates to hose coupling devices and more particularly to couplers for quickly connecting air or gas lines together with an air tight union.

A general aim of the invention is to provide a coupler of this type which is simple in construction, efficient in operation, and is relatively inexpensive to manufacture.

Another object is to provide a new and improved coupling device embodying interfitting coupler sections having conduits therein arranged to meet within a sealing gasket to provide a tight union, and having means for supporting the gasket in place serving also to guide the movement of the conduits together.

Another object is to provide in such a coupling device a hose nipple mounted and supported in a novel manner for relative rotational or swiveling movement.

Other objects and advantages will become apparent in the following description and from the accompanying drawing in which:

Figure 1 is a disassembled view of the elements of a coupling device embodying the features of the invention, one element being shown in elevation and the other in partial axial section.

Fig. 2 is a sectional view through the assembled device, the line of section being indicated by line 2—2 of Fig. 1.

Fig. 3 is a view looking toward the end of one of the coupling elements as indicated by the line 3—3 of Fig. 1.

Fig. 4 is a cross sectional view taken substantially along the line 4—4 of Fig. 1.

Fig. 5 is a cross sectional view taken along the line 5—5 of Fig. 2.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing wherein an exemplary form of the invention is shown for illustrative purposes, the coupling device comprises two sections generally indicated at 10 and 11 and for convenience the sections will be respectively termed the valve section and the nipple section.

The valve section 10 has a tubular body 12 internally screw threaded at one end for engagement by a nut 13. The nut is of substantial thickness and has an axial bore 14 providing a bearing for a tubular hose nipple 15 which extends through the nut and within the housing terminates in a head 16. A gasket 17 is preferably interposed between the head and the end face of the nut. Endwise movement of the hose nipple away from the nut is prevented in any suitable manner as by a split ring 18 fixed on the hose nipple for engagement with the external face of the nut. The projecting outer end of the hose nipple is conventionally fashioned, as shown, to receive the end of a hose or like conduit 19.

At its opposite end the housing 12 is internally somewhat restricted to provide a shoulder 20 spaced and facing inwardly from this end of the housing. A small bushing 21 has a radial flange 22 arranged to seat against the shoulder 20 and the bushing provides end support for a wide flexible sealing gasket 23 formed of rubber, neoprene, or the like. The gasket preferably is seated circumferentially in a groove 23ª in the housing, which groove also provides partial support for the end of the gasket opposite that abutting the bushing. The gasket and bushing are annular and have approximately the same internal diameters.

Valve means, indicated generally at 24, is arranged in the chamber 25 between the gasket and the head of the hose nipple to control the flow of pressure fluid from the hose nipple through the gasket. In this embodiment the valve includes a body 26 arranged to seat against the inner face of the gasket 23. A tubular projection such as the annular flange 27 extends from the body in an axial direction for entry into the internal passage through the gasket. The projection fits within the gasket rather snugly and is provided with a series of air ports 28. The valve body may be cupped or recessed, as at 29, to receive one end of a spring 30 having its other end seated against the hose nipple head. The spring tension normally holds the valve 27 seated. Movements of the valve may be guided in any suitable manner. In this instance the circumferential surface of the body 26 has an angular form (herein shown as hexagonal) providing regularly spaced corners 31 for guiding engagement with the internal surface of the housing. There is ample clearance for the passage of air between the housing surface and the valve body other than at the corners. In this connection it may be mentioned that the spring 30 may be dispensed with if desired since the air pressure on the head will normally seat the valve.

At the extreme end of the housing adjoining the bushing 21, diametrically opposed lugs 32 are formed by slitting the end of the housing and bending the metal freed thereby inwardly. These inturned lugs form a complemental part of the means for quickly connecting the coupling sections 10 and 11 together.

The nipple section 11 comprises a tubular member having a tapered screw threaded end 33 for connection with a tool, pipe or the like, and an intermediate radial flange 34 squared or flattened for engagement by a wrench. The other end of the section is arranged for operative association with the valve section 10 and includes a terminal portion 35 having an outer diameter substantially the same as that of the tubular projection 27 on the valve 24. Inwardly the section is abruptly enlarged, as at 36, providing a shoulder 37 facing toward the end of the section. The length of the terminal portion 35 is such as to locate its end face within the gasket when the sections are assembled.

The enlarged part 36 of the section has a pair of diametrically opposed longitudinally extending grooves 38 to receive the lugs 32 on the section 10. These grooves at their inner ends have lateral continuations 39 extending in the same circumferential direction to define shoulders 40 against which the lugs abut and, if desired, the continuations may be undercut to form lips 41 for holding the parts against accidental disassembly. The grooves and the lugs 32 permit the assembly of the two sections by a straight line movement together followed by a rotational movement to dispose the lugs behind the lips 41. During this movement the terminal portion 35 of the section 11 enters the opening through the bushing 21 and has been guided thereby into the opening through the gasket 23. In its further inward movement the end face of the section 11 engages the end of the tubular projection 27 to unseat the valve 26. In assembly the abutting faces of the nipple 11 and the valve projection 27 are located within the gasket to eliminate leakage and maintain the relationship of the valve 24 to the gasket. Since the bushing 21 guides the end of the section 11 into the opening through the gasket, it is impossible for the end of the section when entering the gasket to engage the end face thereof and twist or distort the gasket out of its cylindrical condition. This is important since if the gasket were thus distorted leakage would occur.

It will be evident from the foregoing that a new and improved coupling device has been provided of simple and inexpensive construction, and which will quickly and efficiently connect two conduits together in leak-tight, swiveling relation.

I claim as my invention:

A coupling device having, in combination, a tubular housing having at one end an axially disposed plug carrying swivelling means for connection with a conduit, a lateral flange carried by said swivel connection means within said housing, sealing means interposed between said flange and the inner end of said plug, an annular ring seated in said housing, an annular sealing gasket seated on said ring and having substantially the same internal diameter as said ring, a valve normally seated on said gasket to prevent a flow from said conduit through said housing, said valve including a member extending into said gasket, an axially disposed coil spring interposed under compression between said valve and said flange, and a nipple having an end portion arranged to be guided into said gasket by said ring, the nipple receiving end of said housing having circumferentially spaced inwardly bent integral portions providing lugs, an enlarged portion on said nipple spaced from its free end and dimensioned to fit relatively snugly into the open end of said housing and having grooves therein terminating in circumferentially directed inner end portions for detachable engagement by said lugs upon relative axial and rotational movement of said nipple and housing, the parts being so dimensioned that the line of engagement of the end portion of said nipple with said member on said valve is located within said gasket when said lugs are seated in the inner end portions of said grooves.

ERNEST H. SHAFF.